United States Patent
Hartman et al.

(10) Patent No.: US 8,379,584 B2
(45) Date of Patent: Feb. 19, 2013

(54) GENERALIZED DIVISION FREE DUPLEXING TECHNIQUES FOR DECREASING RENDEVOUS TIME

(75) Inventors: Michael James Hartman, Clifton Park, NY (US); John Erik Hershey, Ballston Lake, NY (US); Richard Louis Zinser, Niskayuna, NY (US); John Anderson Fergus Ross, Niskayuna, NY (US); Michael J. Dell'Anno, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 12/761,129

(22) Filed: Apr. 15, 2010

(65) Prior Publication Data

US 2011/0255448 A1    Oct. 20, 2011

(51) Int. Cl.
*H04B 7/00* (2006.01)
*H04W 4/00* (2009.01)

(52) U.S. Cl. ............ 370/329; 370/338; 370/341
(58) Field of Classification Search .......... None
See application file for complete search history.

(56) References Cited

U.S. PATENT DOCUMENTS

| | | | |
|---|---|---|---|
| 2007/0201423 A1* | 8/2007 | Laroia et al. | 370/345 |
| 2008/0025324 A1* | 1/2008 | Sawada | 370/400 |
| 2008/0144666 A1* | 6/2008 | Ross et al. | 370/477 |
| 2009/0052500 A1* | 2/2009 | Bush et al. | 375/145 |
| 2009/0111463 A1* | 4/2009 | Simms et al. | 455/424 |
| 2010/0046483 A1* | 2/2010 | Nandagopalan | 370/337 |

OTHER PUBLICATIONS

Chen et al.; Division-Free Duplex for Wireless Applications; Electronic Letters; Jan. 22, 1998, vol. 34, No. 2.

* cited by examiner

*Primary Examiner* — Chi Pham
*Assistant Examiner* — Soon-Dong D Hyun
(74) *Attorney, Agent, or Firm* — Jean Testa; Fletcher Yoder

(57) ABSTRACT

Provided are methods and systems of using division-free duplexing (DFD) to reduce rendezvous time between two or more cognitive radio devices. The cognitive radio devices may opportunistically use available frequency spectra by communicating over available channels. To communicate, a first device may rendezvous with a second device by transmitting a beaconing signal over a frequency on which the second device is listening. DFD techniques may enable each of the devices to listen to a channel while concurrently transmitting beacon signals over the same channel. As periods of listening and periods of transmitting over the same channel need not be separated due to the transmitter cancelling approach used in DFD techniques, rendezvous time may be significantly reduced. Further, embodiments include a generalized DFD (GDFD) approach wherein devices listen to a broad band of frequencies, thus further reducing rendezvous time.

23 Claims, 4 Drawing Sheets

GENERALIZED DIVISION FREE DUPLEXING TECHNIQUES FOR DECREASING RENDEVOUS TIME

BACKGROUND

The subject matter disclosed herein relates to cognitive radio techniques, and more particularly, to systems and methods of using division free duplexing over cognitive radio spectra.

As wireless communication has evolved, the importance of efficient spectral use has become increasingly important. The Federal Communication Commission (FCC) has recognized that while many communication technologies crowd within certain spectral boundaries, many other parts of the radio frequency spectrum are underutilized. Techniques for monitoring spectral usage and opportunistically transmitting across unused frequencies in a way which minimizes interference may be generally referred to as cognitive radio technology. By using spectral awareness, cognitive radio technology may provide more efficient spectral use and improve communication for various wireless technologies.

Cognitive radio spectrum allocation may involve classifications of primary users and secondary users, where the primary user may have superior rights (e.g., via a license) to operate (e.g., transmitting and receiving signals) in an allocated frequency spectrum. Secondary users may operate by sensing spectra that is not in use by a primary user, transmitting over a selected unused frequency spectrum (referred to as a channel), and dynamically altering transmission frequencies during a communication to avoid interferences with primary users, should a primary user enter the selected, previously unused channel. Thus, cognitive radio networks may enable the use of spectrum in an opportunistic manner while avoiding transmission interferences with primary users of the spectrum.

To communicate within a network, cognitive radio devices may establish communication by transmitting and receiving signals with one or more other devices in the network. The ability of two or more communicating devices to meet and establish a link (e.g., a mutual transmitting and receiving of signals) may be referred to as a rendezvous. To operate opportunistically, a secondary user may dynamically sense spectrum use over a potentially large number of channels, and may find a number of channels where a rendezvous can potentially occur. Further, a primary user may be active or become active in any of these channels. Thus, a secondary user should not only establish a rendezvous, but also maintain a rendezvous to minimize interferences with primary users.

Generally, rendezvous schemes involve methods of establishing and maintaining a rendezvous between communicating devices. One type of rendezvous scheme, referred to as aided rendezvous, may involve the use of dedicated control channels for certain devices or clusters of devices (e.g., of a central base station) in a network. As a limited number of control channels are available for establishing a rendezvous between devices, a device may not need to search an unlimited number of channels to rendezvous with another device. However, aided rendezvous schemes may be limited by bottlenecks over common channels and additional complexity and cost in dedicating certain control channels to certain clusters of devices in a network. Another type of rendezvous scheme, referred to as unaided rendezvous or blind rendezvous, may involve allowing all channels to be shared for rendezvous establishment by any device. Blind rendezvous may provide increased channel flexibility, increased scalability and robustness of a network, as well as potentially improved efficiency in channel utilization. However, due to the fact that all channels are potentially available for rendezvous, devices may search a large number of channels over a long amount of time before establishing a rendezvous.

BRIEF DESCRIPTION

In one embodiment, a method of managing a communication in a communication network is provided. The method includes analyzing spectral use using cognitive radio protocols to determine available spectra, continuously receiving (e.g., listening for incoming transmissions) over a band of frequencies, and transmitting a beacon signal over a beacon frequency within the band of frequencies while concurrently receiving over the band of frequencies. As used herein, cognitive radio protocols may refer to protocol requirements for cognitive radio networks, which may be developed by the Federal Communication Commission (FCC) or developed through private licensing agreements. For example, standardized cognitive radio protocols may include the IEEE 802.15.2 WPAN Task Group 2, which provides coexistence mechanisms, and IEEE 802.19 Wireless Coexistence Working Group.

Another embodiment provides a communication system including multiple communication devices configured to analyze the spectral use of a radio frequency spectrum, select one or more frequencies for communication based on the analysis of the spectral use, and use division free duplexing (DFD) to concurrently receive incoming transmissions from other communication devices in the system and transmit an outgoing beacon signal over the selected one or more frequencies.

Yet another embodiment provides a method including identifying available channels for communication using cognitive radio techniques and transmitting an outgoing beacon based on the available channels while concurrently listening to the frequency spectrum for an incoming beacon. Division-free duplexing (DFD) techniques enable a device to concurrently transmit and listen over the same channel by cancelling interferences between the incoming beacon and the outgoing beacon.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The blind rendezvous problem may refer to delays associated with establishing a rendezvous between two devices, and may result from delays in meeting two rendezvous requirements. First, to establish a rendezvous in typical network configurations, a first device must communicate with a second device (e.g., by transmitting and/or receiving signals) over the same frequency (e.g., channel). Further, the first device typically must be transmitting over the channel while the second device is receiving those transmissions (e.g., listening) on the same channel, or vice versa. Thus, for a communication to occur, the first and second devices must rendezvous, or find a common channel over which signals may be transmitted by one device is received by another device.

Typically, a beaconing approach may be used to rendezvous between two devices wishing to communicate. Beaconing may refer to the periodic transmission of signals over a sequence of one or more channels and may be used to establish a rendezvous between two or more devices wishing to communicate. For example, the first device may beacon on one channel, and the second device may listen on that channel and receive the beacon signal of the first device, thus establishing rendezvous between the first and second devices. However, due to the unaided infrastructure of blind rendezvous, the first device may not initially know which channel(s) may be available for rendezvous, or which channel(s) on which the second device may be transmitting or listening. Further, failure to align a transmission period of one device with a listening period of another device on a common channel may also result in rendezvous failure. Thus, due to the lack of network infrastructure in blind rendezvous schemes, two devices may beacon for a long time before establishing a rendezvous, which may be referred to as rendezvous delays.

Figure 1:
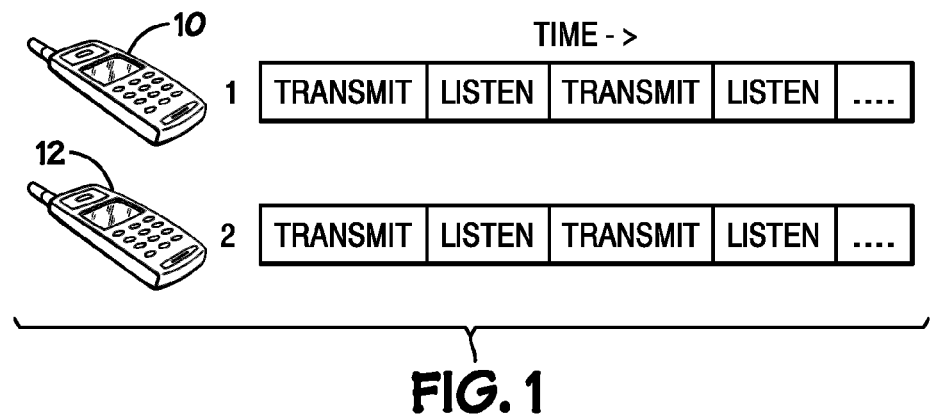
FIG. 1 is a timing diagram depicting a rendezvous technique of two communication devices that are alternatingly transmitting and listening, in accordance with embodiments of the present techniques.

The diagram in FIG. 1 illustrates a timing diagram depicting an example of one situation where the first and second devices do not achieve rendezvous. The first device 10 may follow a periodic beaconing transmission sequence, including segments of time where the first device 10 is transmitting and segments of time where the first device 10 is listening. As illustrated by FIG. 1, if the second device 12 follows the same beaconing transmission sequence, the transmission periods of the first device 10 and the second device 12 may align, and listening periods of the first and second devices 10 and 12 may also align, such that a transmission period of the first device 10 never aligns with a listening period of the second device 12 (or vice versa). In such a situation, the first and second devices 10 and 12 may never rendezvous.

Different types of beaconing approaches have been used to reduce such rendezvous failures. For example, one approach referred to as random rendezvous may involve a randomization of the transmitting and listening periods, such that the first device 10 may eventually transmit over a channel on which the second device 12 is listening. However, such an approach may still result in rendezvous delays, as the first device 10 may transmit over a sequence of different channels, and the transmitting period on a channel of the first device 10 must also coincide with the listening period the second device 12 on that particular channel to achieve a rendezvous. Another approach, referred to as sequence-based rendezvous, also seeks to reduce rendezvous failures by employing a predefined sequence of channels used by the transceivers of both the first and second devices. The sequence used by both transceivers may be arbitrarily delayed with respect to each other, such that the first device 10 may eventually transmit over a channel on which the second device 12 is listening. However, the sequence-based rendezvous may also still result in rendezvous delays.

Figure 2:
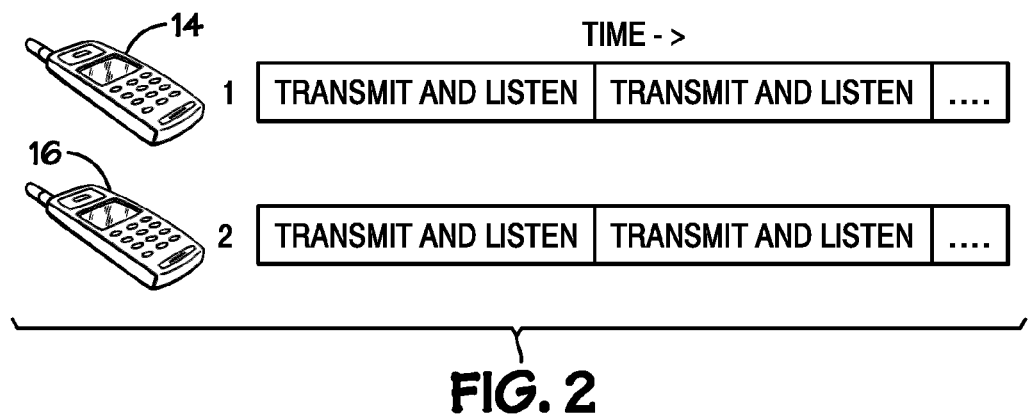
FIG. 2 is a timing diagram depicting a rendezvous technique of two communication devices using generalized division-free duplexing (GDFD), in accordance with embodiments of the present techniques.

In one or more embodiments, a generalized division-free duplexing (GDFD) technique may be employed to reduce rendezvous time by enabling a device to transmit over one or more channels while concurrently receiving (e.g., listening) over a relatively wide band of frequencies. As will be discussed, division-free duplexing (DFD) techniques may be different from conventional division duplex systems in that a DFD enabled transceiver may simultaneously transmit signals and receive transmissions over the same frequency (e.g., channel). Because GDFD techniques may enable the device to concurrently transmit and listen over a relatively wide band of frequencies, rendezvous time may be significantly reduced compared to rendezvous schemes involving separate transmitting and listening periods. A diagram illustrating this general concept is provided in FIG. 2, where a first device 14 and a second device 16 may each have a transceiver configured to concurrently transmit and listen over the same channels.

To explain the GDFD techniques used in the present techniques, an explanation of conventional duplexing techniques is provided. Typically, during a communication, each of the communicating devices may include a transceiver, or a transmitter to transmit signals and a receiver to receive incoming transmissions. However, because the two communicating devices are transmitting and receiving different signals from substantially opposite directions along a communication route (e.g., a series of links or signal pathways between two communicating devices), interferences may occur between the two signals. Division duplexing techniques, such as time-division duplexing and frequency-division duplexing, are typically applied to enable a two-way communication route. For example, time-division duplexing may use time-division multiplexing to separate incoming (received) and outgoing (transmitted) signals. As incoming and outgoing signals may be separated in time, the signals may be carried on the same frequency or channel. Furthermore, the time-division of the signals may be sufficiently fast such that signals may be perceived as being transmitted and received simultaneously. Frequency-division duplexing may involve signal transmitters and receivers which operate on different frequencies. The frequencies of the transmitted and received signals at one transceiver may be sufficiently separated such that their modulated frequency spectra do not overlap. In frequency-division duplexing, the receiver of each communication device may be tuned to receive an intended frequency and reject its own transmitted signal. By transmitting signals through different frequency spectra, the transmitting and receiving of signals may occur simultaneously.

Although division duplex systems may enable the near-simultaneous transmitting and receiving of signals, such systems may be insufficient for reducing delays in blind rendezvous. For example, a time-division duplexing technique may involve time multiplexing of transmitting and receiving over a channel, and failure (or delays) in aligning the transmitting period of one device with the receiving period of another device may result in delays. Furthermore, a frequency-division duplex technique may introduce limitations into the available frequency spectra by designating certain channels as transmitting or receiving channels on certain devices.

The generalized division-free duplex (GDFD) beaconing approach used in the present techniques may reduce rendezvous delays by allowing one or more devices to transmit and receive (e.g., listen) on substantially the same frequency and at substantially the same time. Such techniques may be applicable for any cognitive radio users, including wireless communication (e.g., cellular communication), radio communication, broadcasting, short-range point-to-point communication, wireless sensor networks, and wireless computer networks, etc.

Figure 3:
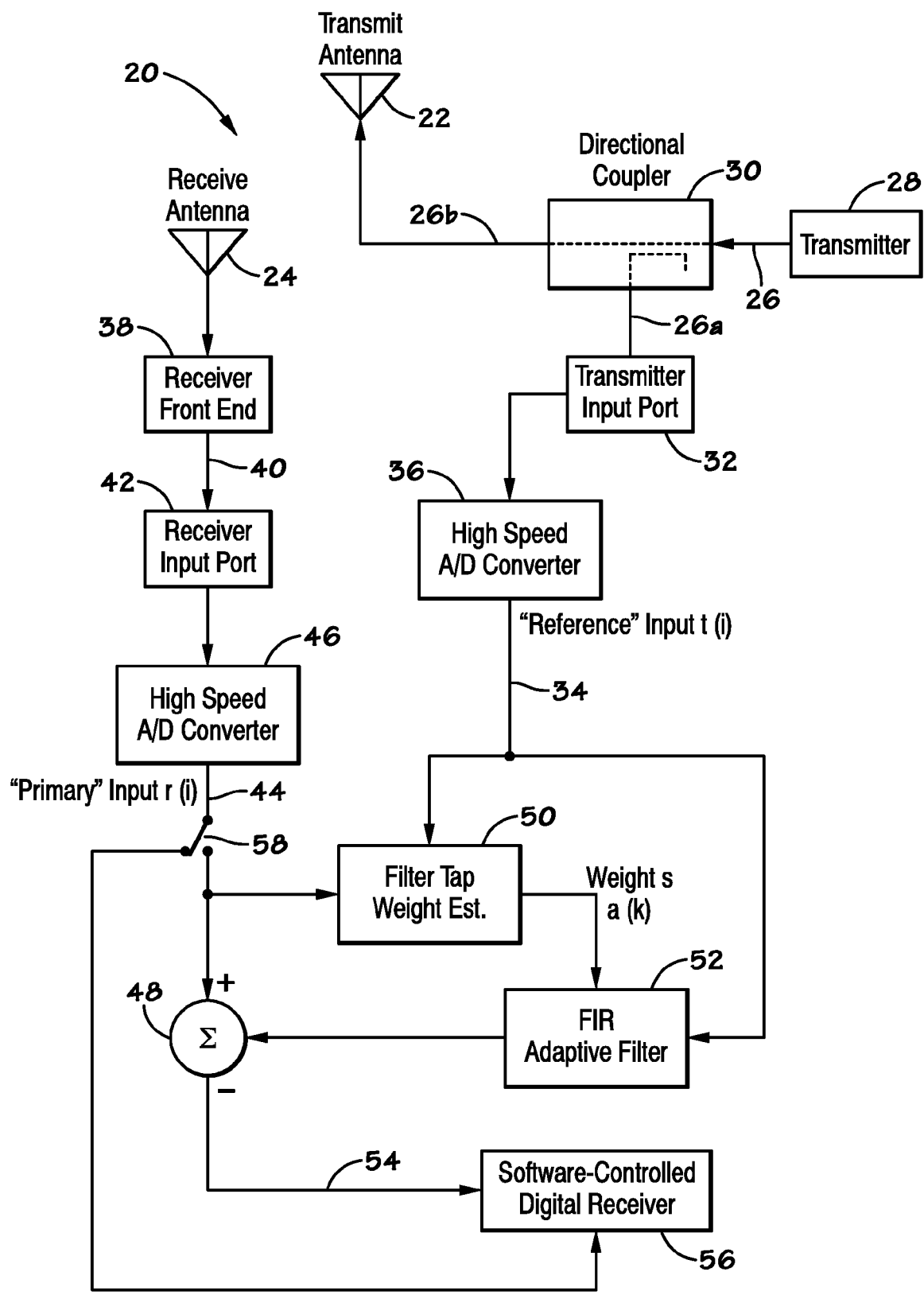
FIG. 3 is an example of a system configured for division-free duplexing (DFD), in accordance with embodiments of the present techniques.

In one embodiment, a software-based adaptive filter may be implemented in a cognitive radio device to enable division-free duplexing (DFD) in the device. An example of a DFD system implemented in a cognitive radio device is illustrated in FIG. 3. Generally, the DFD system 20 may operate by using a software-based adaptive filter to estimate an interference in the received signal, which may include subtracting a corrupted version of the transmitted signal. The DFD system 20 may include a transmit antenna 22 and a receive antenna 24. In the transmitter portion of the system 20, a portion of the signal 26 from a transmit source (transmitter 28) is input to a directional coupler 30 to produce an attenuated signal 26a representative of the transmitted signal 26 while the bulk of the signal 26b is input to a transmit antenna 22 and radiated as RF energy. The attenuated signal 26a is input to a transmitter input port 32 and is converted to a digital signal 34 by an A/D converter 36.

In the receiver portion of the system, a radiated RF signal (radiated signal 26b) may be transmitted by the transmit antenna 22 and received by a receive antenna 24 and passed through a receiver front end 38 to produce a received signal 40. Some embodiments may involve cable or wire-based communication, and a cable signal may be directly passed to the receiver front end 38 without being received at the antenna 24. The receiver front end 38 may include analog amplifiers and/or filters, such as a wideband buffer amplifier. The received signal 40 may be input to a receiver input port 42, which in an embodiment may include hardware components such as an input jack, and may be converted to a digital signal 44 by an A/D converter 46. In embodiments, the received signal 40 and the attenuated signal 26a may be converted to digital signals by a single multichannel A/D converter, e.g., a high-speed 14-bit converter, or by multiple A/D converters. The resulting digital received signal 44, also referred to as the primary input signal 44, is then input to a summer 48 and adaptive filter tap weight estimator 50. The digital attenuated signal 34, also referred to as the reference signal 34, is also input to estimator 50 and the digital adaptive filter 52. The tap weight estimator 50 may periodically provide tap weight values to digital filter 52. The digital filter 52 may provide an estimate of the transmitted signal that may be subtracted from the received signal with summer 48 to provide a cancelled signal 54.

The digital adaptive filter 52 and summer 48 are software-controlled and may include a backward adaptive filter tap estimator or a block forward tap estimator, in embodiments. In one embodiment, the adaptive filter/summer difference equation is given by:

$$y(i) = r(i) - \sum_{k=0}^{M-1} a(k)t(i-k) \quad (1)$$

where y(i) are the output samples, r(i) are the receiver input port samples (also known as the primary input signal), t(i) are the transmitter input port samples (also known as the reference input signal), M is the length of the adaptive filter, and a(k) are the adaptive filter tap weights. The filter taps can be estimated by solution of the following matrix equation:

$$\begin{bmatrix} R_{tt}(0,0) & R_{tt}(0,1) & \ldots & R_{tt}(0,M-1) \\ R_{tt}(1,0) & R_{tt}(1,1) & \ldots & R_{tt}(1,M-1) \\ \ldots & \ldots & \ldots & \ldots \\ R_{tt}(M-1,0) & R_{tt}(M-1,1) & \ldots & R_{tt}(M-1,M-1) \end{bmatrix} \begin{bmatrix} a(0) \\ a(1) \\ \ldots \\ a(M-1) \end{bmatrix} = \begin{bmatrix} R_{tr}(0) \\ R_{tr}(0) \\ \ldots \\ R_{tr}(M-1) \end{bmatrix} \quad (2)$$

where $$R_{tt}(j,k) = \sum_{i=M-1}^{N-1} t(i-j)t(i-k) \quad (3)$$

and $$R_{tr}(k) = \sum_{i=M-1}^{N-1} r(i)t(i-k) \quad (4)$$

and where N is the length of the block of transmitter input port/receiver input port samples over which to estimate the filter taps.

Once the digital filter 52 provides an estimate of the transmitted signal that may be subtracted from the received signal using the summer 48, the resulting cancelled signal 54 may then be input to a software-controlled digital receiver 56 and may be further processed in any suitable manner. The cancelled signal 54 may be relatively clean from interferences resulting from transmitting and receiving signals over one frequency or channel. In an embodiment, the system 20 may include a bypass switch 58 for passing the signal 40 directly to the receiver 56 without being processed by the digital adaptive filter 52. For example, such an embodiment may be implemented if the signal 40 is degraded or corrupted to such an extent that digital cancellation may not be effective.

In some embodiments, a DFD system 20 such as that illustrated in FIG. 3 may be implemented in one or more cognitive radio devices in a communication network suitable for using cognitive radio technology. These devices, referred to as DFD enabled devices, may beacon to other cognitive radio devices by transmitting and receiving beaconing signals on substantially the same channel and at substantially the same time while reducing and/or eliminating the effects of interferences resulting from oppositely propagating signals over a common channel. Such DFD enabled devices may further reduce rendezvous delays by enabling a DFD enabled device to listen over many channels while concurrently beaconing over one or more channels.

Figure 4:
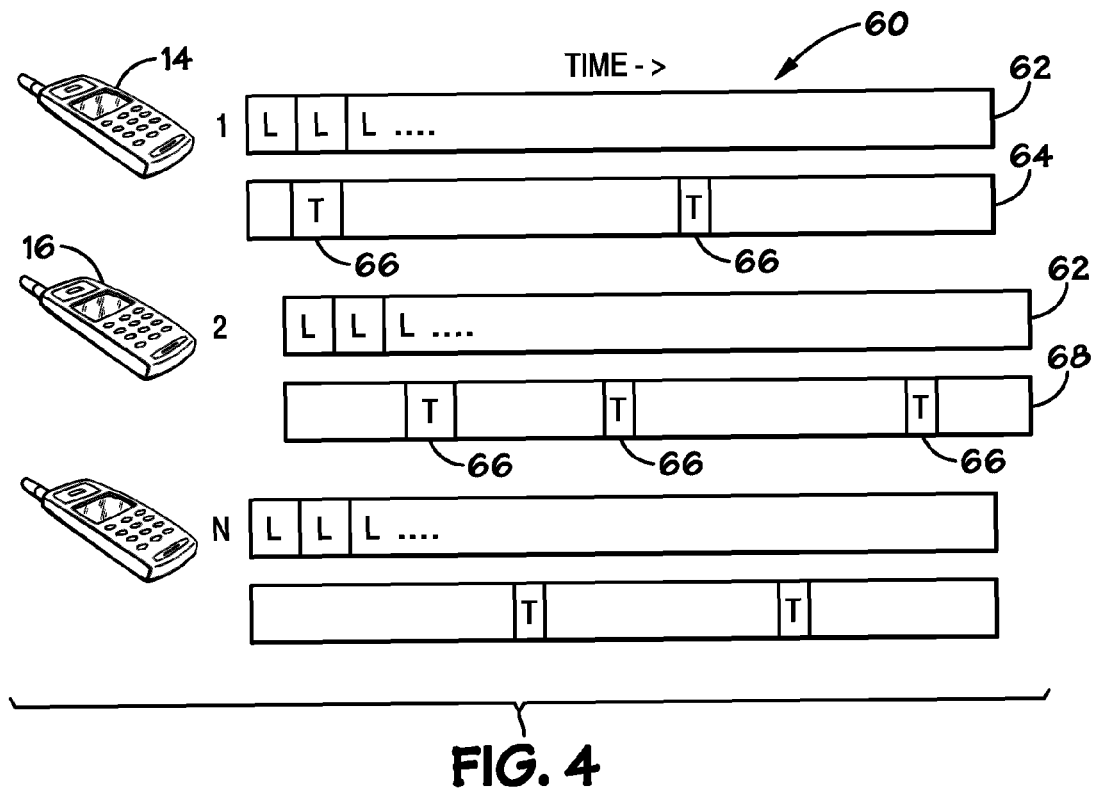
FIG. 4 is a timing diagram depicting a rendezvous technique of two communication devices including continuous listening and randomized transmitting in time, in accordance with embodiments of the present techniques.

One example of a rendezvous technique for two cognitive radio devices 14 and 16 having DFD enabled transceivers is depicted in the timing diagram 60 of FIG. 4. Each of the cognitive radio devices 14 and 16 may be suitable for monitoring spectral use in a cognitive radio network. A cognitive radio (CR) device may choose frequencies (e.g., channels) over which to transmit signals for requesting communication (e.g., beacons), based on the monitoring of spectral use of the radio frequency spectrum. In some embodiments, the CR device 14 or 16 may select channels for beaconing and communicating based on predefined spectrum access protocols. For example, the devices 14 or 16 may be characterized as secondary users of the radio frequency spectrum, and may operate by determining which channels are not being used by primary users and/or other secondary users. Alternatively, primary users in a CR network may also follow spectrum access protocols. Further, as depicted, a cognitive radio network may have multiple devices (e.g., as represented by device N), and each of the N devices may represent a primary user, a secondary user having rights secondary to that of the primary user, and/or a facilitator suitable for enabling rendezvous and/or maintaining links between CR devices. Cognitive radio protocols may include protocol requirements for cognitive radio networks developed by the Federal Communication Commission (FCC) or developed through private licensing agreements. For example, standardized cognitive radio protocols may include the IEEE 802.15.2 WPAN Task Group 2, which provides coexistence mechanisms, and IEEE 802.19 Wireless Coexistence Working Group.

In some embodiments, a CR network may include one or more devices which operate as facilitators in the CR network and enable rendezvous between a requesting device and a requested device. For example, a facilitator may continuously transmit a beacon signal recognized as a facilitating signal, and may concurrently receive request signals from requesting devices (e.g., device 14) in the network. The facilitator may identify a requested device (e.g., device 16) based on the request signals, and may enable a communication between the requesting (e.g., device 14) and requested (e.g., device 16) devices. The facilitator may be a central device in a network, or may be any device (e.g., device N).

The timing diagram 60 of FIG. 4 represents communication devices (e.g., devices 14, 16, N, etc.) using a beaconing approach with a listening sequence 62 of continuous listening (e.g., capable of receiving requesting transmissions or beacons) over a wide band of channels and a transmission sequence 64 having periodic or randomized transmission periods 66. As depicted by the continuous listening sequence 62 for each device (e.g., devices 14, 16, and N), a device 14 may continuously listen and concurrently transmit over a common channel. This may be enabled by the DFD equipment implemented (e.g., DFD system 20 as illustrated in FIG. 3) in each device, as the DFD equipment may reduce or eliminate interferences in the signals received at the receiving portion of the transceiver by estimating and subtracting interferences resulting from signal transmissions. Further, the DFD equipment may enable the device 14 to listen continuously over a wide frequency spectrum of the cognitive radio network, rather than listening over a limited spectrum for limited time periods, as the listening sequence 62 may not need to be specifically designed to prevent interferences with the transmitting periods 66 of the device 14. As such, the present techniques may also be referred to as generalized DFD (GDFD) due to the wide band listening spectrum 62 of DFD enabled devices 14 and 16.

Each of the CR devices 14 and 16 in a CR network may each beacon with different transmission sequences 64 and 68 using algorithmically determined transmission periods, which may include randomized transmissions and/or periodic transmissions. Such algorithmically determined transmission periods where a beacon signal is transmitted from the device 14 or 16 may be referred to as algorithmically determined periods 66. In some embodiments, the GDFD techniques may enable the algorithmically determined transmission periods 66 to occur concurrently with the continuous listening period 62, including instances where a beacon signal is transmitted over a channel on which the device 14 is also listening. Furthermore, because the devices 14 and 16 are listening continuously over a wide band of channels, each transmission or beacon from a requesting device (e.g., device 14) may be received by a requested device (e.g., device 16) with substantially reduced delay (e.g., compared to conventional beaconing approaches previously discussed).

Figure 5:
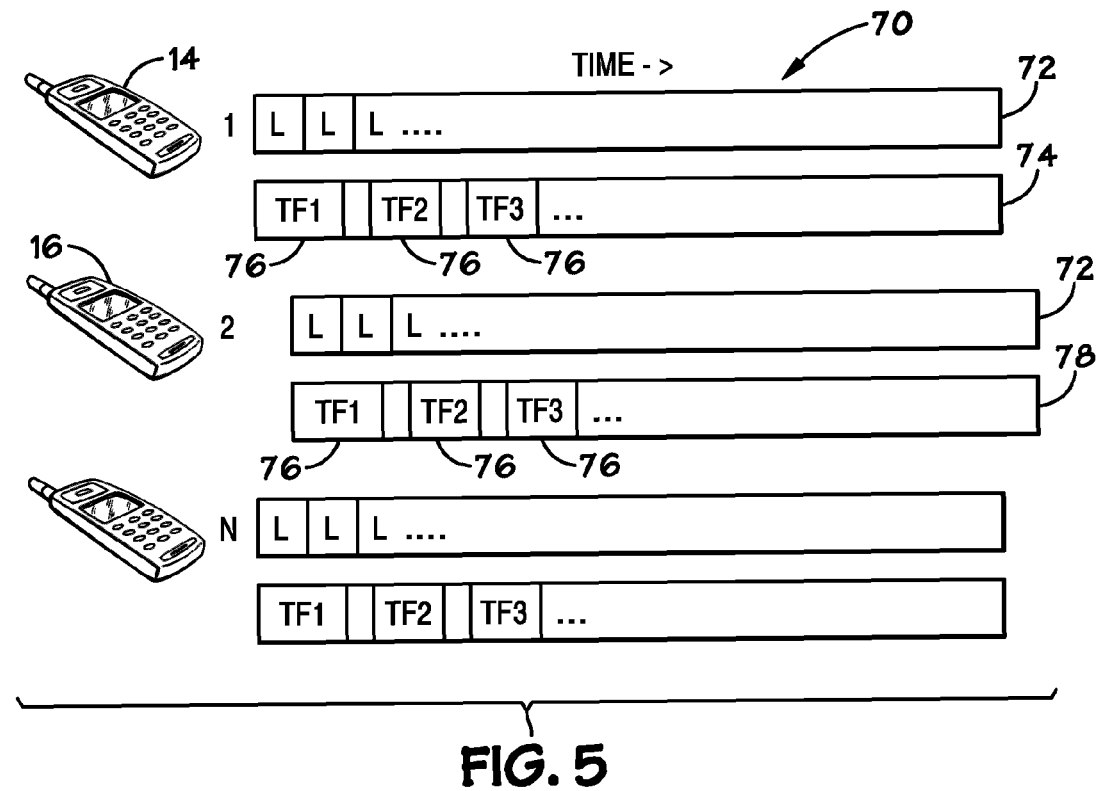
FIG. 5 is a timing diagram depicting a rendezvous technique of two communication devices including continuous listening and randomized transmitting in frequency, in accordance with embodiments of the present techniques.

In another embodiment, rendezvous time may be reduced by using GDFD techniques to enable a communication device to continuously listen over a wide band of channels while beaconing at algorithmically determined randomized channels. As illustrated in FIG. 5, the timing diagram 70 depicts several DFD enabled CR devices (e.g., devices 14, 16, and N) which operate with a continuous listening sequence 72 over a wide band of channels and a transmission sequence 74 having transmission periods 76 of different frequencies (e.g., channels). A transmission sequence 74 which beacons on randomized channels has a higher probability of beaconing on a channel on which a requested device is listening. For example, a second device 16 may be continuously listening on certain channels in the radio frequency spectrum. The channels selected for continuous listening by the second device 16 may be based on a spectral use assessment by the second device 16. However, the first device 14 may determine that different channels are suitable for communication, and may only beacon at channels selected by the first device 14. Thus, as the first device 14 and the second device 16 may select different channels for beaconing and listening based on different spectral use assessments and/or different CR protocols (e.g., the first device 14 may be a primary user while the second device 16 may be a secondary user), using a transmission sequence 74 including randomized channel transmissions may reduce rendezvous delays.

Figure 6:
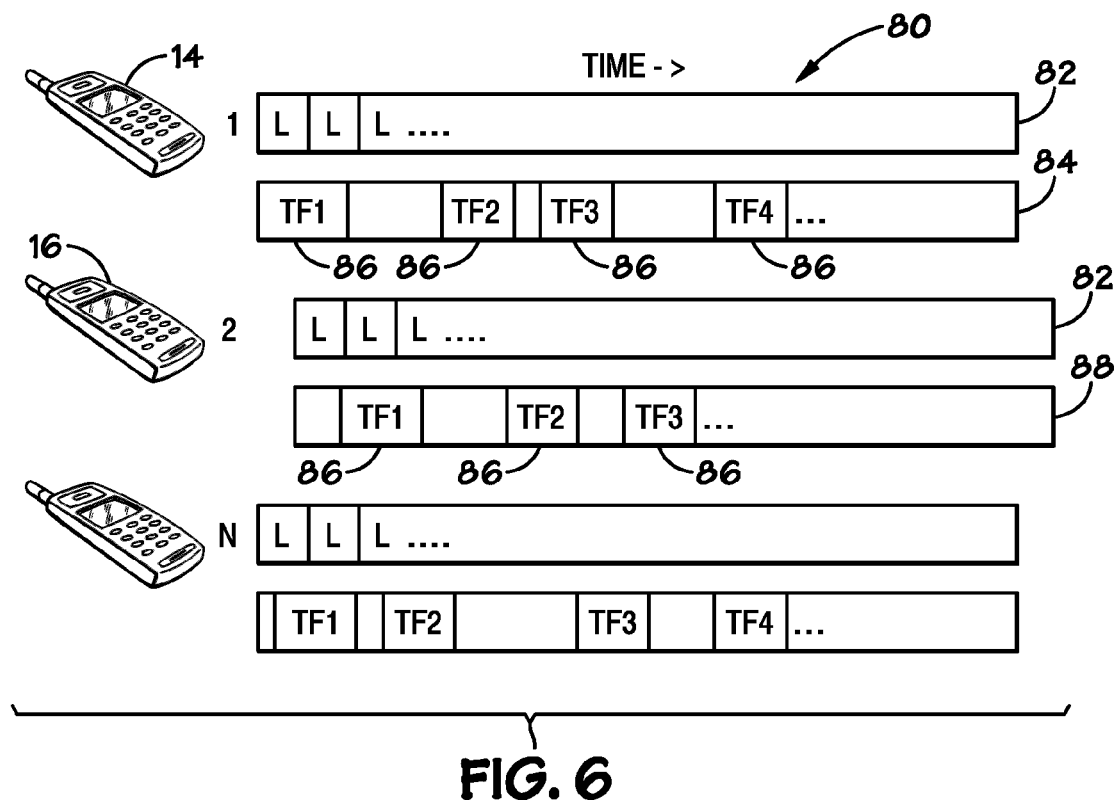
FIG. 6 is a timing diagram depicting a rendezvous technique of two communication devices including continuous listening and randomized transmitting in time and frequency, in accordance with embodiments of the present techniques.

Furthermore, in some embodiments, rendezvous time may be further reduced by using GDFD techniques to randomize beacon signals over time and frequency. As illustrated in FIG. 6, the timing diagram 80 depicts several DFD enabled communication devices (e.g., devices 14, 16, and N) which operate with a continuous listening sequence 82 over a wide band of channels and a transmission sequence 84 having transmission periods 86 of randomized channels. As explained with respect to the timing diagrams 60 and 70 of FIGS. 4 and 5, a transmission sequence 84 beaconing on randomized channels and at randomized times may have a higher probability of beaconing on a channel on which a requested device is listening, possibly reducing rendezvous time. In some embodiments, each cognitive radio device in a network may have different transmission sequences. For example, the transmission sequence 84 of a device 14 may be different from the transmission sequence 88 of another device 16, including beacons transmitted over different channels and over different time intervals.

Figure 7:
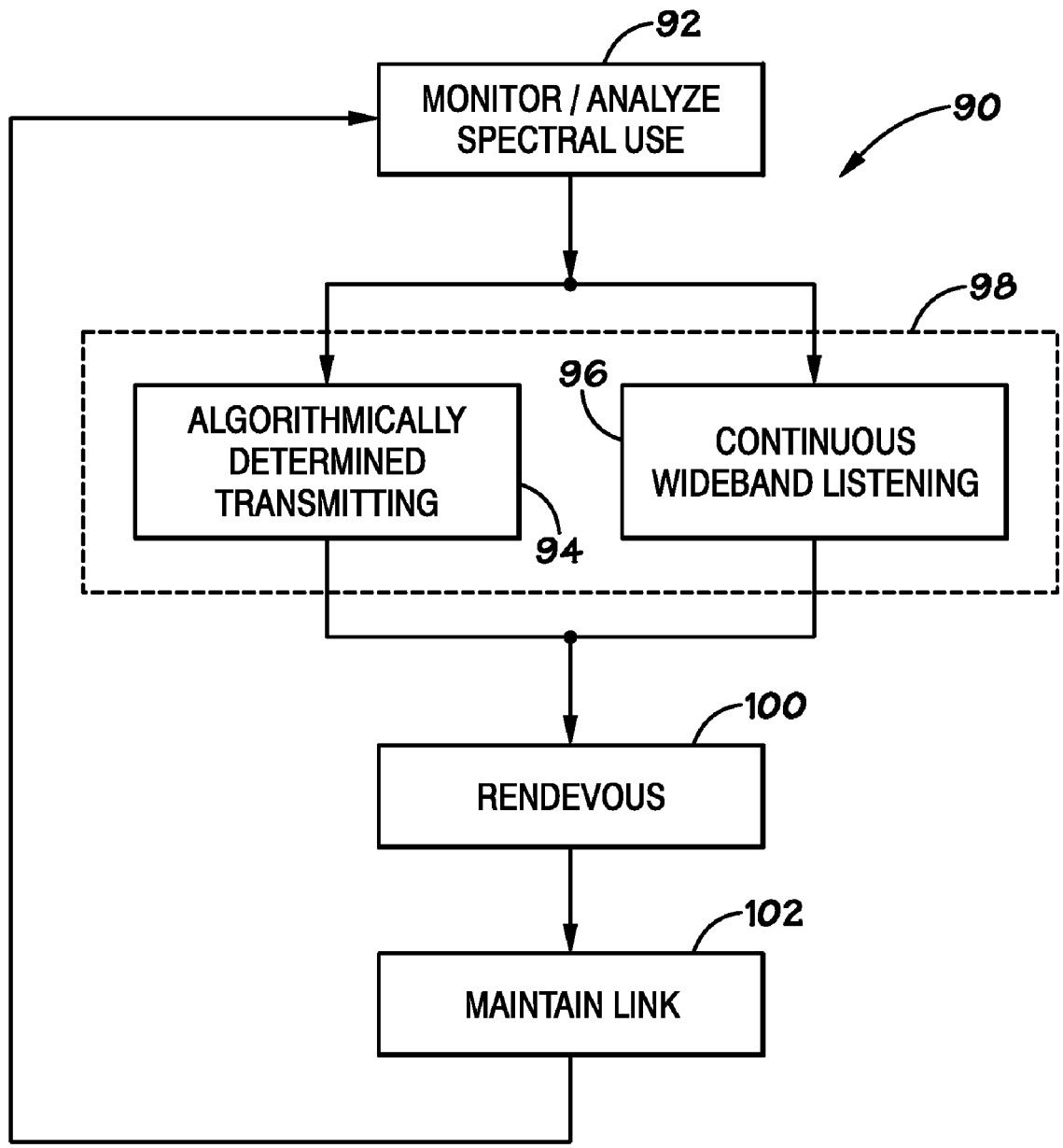
FIG. 7 is a flow chart depicting a process for establishing a rendezvous using a DFD-enabled device, in accordance with embodiments of the present techniques.

The flow chart provided in FIG. 7 illustrates a process 90 for reducing rendezvous time between two or more devices in a cognitive radio network using generalized division-free duplexing (GDFD). The process 90 may be performed by any device (e.g., devices 14, 16, N in FIGS. 4-6) in a network suitable for monitoring and/or analyzing spectral use according to cognitive radio techniques. Further, the device may be configured to perform GDFD (e.g., using the DFD system 20 in FIG. 3) such that the device may continuously listen while concurrently beaconing, thus decreasing rendezvous time.

In one embodiment, the process 90 may begin as the device analyzes (block 92) spectral use. The device may analyze any frequency (e.g., channel) suitable for signal transmission to and from the device. The device may use cognitive radio protocols to select channels over which to communicate based on channels determined to be unused and/or available.

Determination of unused or available channels may be based on predetermined protocols, which may consider spectral use by other users having varying levels of priority, such as primary users (e.g., licensed users) and/or different levels of secondary users. Spectral use analysis (block 92) may involve statistical analysis of spectral use and/or dynamic monitoring of spectrum.

In some embodiments, preventing interferences by secondary users on communications of primary users may involve transmitting a silencer signal to an interfering secondary user. For example, an interfering secondary user may transmit over a channel occupied by a primary user. Due to possible blockages in the network, the secondary user may not detect that a channel is being used. Such a blockage may be referred to as hidden node interference. An observer (e.g., any other device in the network) of the hidden node interference may transmit a silencer signal to the secondary user, and the secondary user may receive and process the silencer signal and cease to transmit over the occupied channel. As a DFD enabled secondary user may be continuously listening, the DFD enabled secondary user may receive the silencer signal relatively quickly and cease to transmit over the occupied channel. In some embodiments, the silencer signal may have a short duration, and may be standardized or developed such that any interfering secondary user may cease to transmit over an occupied channel after receiving and processing the silencer signal.

Once the device determines unused or available channels, the device may follow a beaconing approach 98 in accordance with the present techniques. The beaconing approach 98 may involve continuously listening (block 96) over all available channels, which may be a wide band of frequencies. The continuous listening of the device may enable the device to receive beacon signals transmitted from other devices which also wish to communicate. The beaconing approach 98 of the device also includes an algorithmically determined transmitting (block 94) of beacon signals over the channels determined to be unused or available. This algorithmically determined transmitting (block 94) may be concurrent with the continuous listening (block 96), and may include signal transmissions over channels to which the device is also continuously listening (block 96).

As previously discussed with respect to FIGS. 4-6, the transmitted beacon signals may be periodic or randomized with respect to time (e.g., randomized time periods of transmitting beacon signals). Further, the transmitted beacon signals may be randomized with respect to frequency (e.g., transmitting beach signals over a randomized sequence of channels determined to be available) and/or randomized with respect to both time and frequency (e.g., randomized time periods of transmitting randomized channels). Due to the GDFD techniques used with the device, the DFD enabled devices may be capable of continuous wide band listening and concurrent transmission of beacon signals over common channels. As discussed, such techniques may reduce the time in establishing rendezvous (block 100) between two or more devices wishing to communicate. Once a rendezvous (block 100) is achieved, two or more devices may communicate, which may involve transmitting and receiving data over the channel on which the rendezvous is established. The data may include, for example, bit data, voice data, or any type of data suitable for communicating information via wireless signal transmission over a selected frequency.

In some embodiments, the process 90 may include maintaining (block 102) the link established between two or more communicating devices. Maintaining (block 102) the communication link may involve continuously monitoring (block 92) the spectral use of the network to reduce interferences between different devices seeking to communicate over common channels. For example, a device may be a secondary user of the frequency spectrum, and a primary user may have superior rights in using the spectrum. In some embodiments, if a primary user begins to use a channel which the secondary user is using, the secondary user may discontinue communication over the previously available channel. The secondary user may maintain (block 102) the communication and/or prevent drops in the communication by continuously monitoring and/or analyzing (block 92) spectral use and dynamically selecting available channels on which to perform the beaconing approach (block 98).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of managing a communication between devices in a network, the method comprising:
   analyzing spectral use using cognitive radio protocols to determine available spectra;
   continuously receiving over a band of frequencies; and
   transmitting a beacon signal over a beacon frequency within the band of frequencies while receiving over the band of frequencies, wherein continuously receiving over the band of frequencies and transmitting the beacon signal over the beacon frequency within the band of frequencies while receiving over the band of frequencies is enabled by implementing a division-free duplexing (DFD) technique in one or more of the devices.

2. The method of claim 1, comprising:
   establishing a rendezvous when a first device transmits a first beacon signal over a first frequency while a second device receives the first beacon signal; and
   maintaining the rendezvous according to the cognitive radio protocols.

3. The method of claim 2, wherein maintaining the rendezvous comprises transmitting a second beacon signal from the first device over a second beacon frequency within the band of frequencies while receiving over the band of frequencies at the first device.

4. The method of claim 2, wherein maintaining the rendezvous comprises monitoring spectral use of the first frequency and transmitting the beacon signal over a second frequency within the band of frequencies when a third device transmits over the first frequency, wherein the third device has a higher priority than one or both of the first device and the second device.

5. The method of claim 1, comprising implementing a division duplexing technique when the division duplexing technique is more reliable than the DFD technique.

6. The method of claim 1, wherein the DFD technique comprises:
   receiving an analog primary signal from a receiver front end, an antenna, or a receiver input port;
   receiving an analog reference signal from a transmitter;
   converting the analog primary signal into a digital primary signal;
   converting the analog reference signal into a digital reference signal;
   processing the digital reference signal with a digital adaptive filter, wherein the digital adaptive filter uses the digital reference signal and digital primary signal as inputs for determining filter weights of the digital adaptive filter to provide an output; and subtracting the output of the digital adaptive filter from the digital primary signal to generate a digital cancelled signal.

7. The method of claim 1, wherein the available spectra comprises spectra that is not used by primary user devices of the spectra, and wherein the beacon frequency is in the available spectra.

8. The method of claim 1, wherein the band of frequencies comprises all the available spectra.

9. The method of claim 1, wherein transmitting the beacon signal comprises:

transmitting a first beacon signal from a first device according to a first beaconing sequence; and transmitting a second beacon signal from a second device according to a second beaconing sequence, wherein the first beaconing sequence has randomized periods of transmitting the first beaconing sequence with respect to periods of transmitting the second beaconing sequence in the second beacon signal.

10. The method of claim 1, wherein transmitting the beacon signal comprises transmitting a beacon signal over a plurality of beacon frequencies within the band of frequencies, wherein the plurality of beacon frequencies is transmitted individually according to a randomized order to form the beacon signal.

11. The method of claim 1, wherein transmitting the beacon signal comprises transmitting a beacon signal over a plurality of beacon frequencies within the band of frequencies, wherein the plurality of beacon frequencies is transmitted individually according to a randomized order and for randomized periods of time to form the beacon signal.

12. A communication system, comprising:

a plurality of communication devices, each configured to:
analyze spectral use of a radio frequency spectrum;
select one or more frequencies for communication based on the analysis of the spectral use; and
use division free duplexing (DFD) to concurrently receive incoming transmissions from others of the plurality of communication devices in the system and transmit an outgoing beacon signal over the selected one or more frequencies.

13. The communication system of claim 12, wherein each of the plurality of communication devices is configured to receive incoming transmissions over all of an available spectrum band in the radio frequency spectrum.

14. The communication system of claim 12, wherein a secondary device of the plurality of communication devices is configured to analyze spectral use to avoid interferences with a primary device of the plurality of communication devices, wherein the primary device has superior rights to the one or more frequencies in the radio frequency spectrum.

15. The communication system of claim 12, wherein a first device of the plurality of communication devices is configured to communicate with a second device of the plurality of communication devices when a first beacon signal is transmitted over a first frequency from the first device and received at the second device.

16. The communication system of claim 15, wherein the first device is configured to select a second frequency for communication with the second device with the first device determines that the first frequency is unavailable based on the analysis of spectral use.

17. The communication system of claim 12, comprising a DFD enabled communication facilitator device configured to:

continuously transmit a facilitating beacon signal;
receive a request signal from a requesting device of the plurality of communication devices while continuously transmitting the facilitating beacon signal;
identify a requested device of the plurality of communication devices based on the request signal; and
enable a communication between the requesting device and the requested device.

18. The communication system of claim 12, wherein the outgoing beacon signal comprises one or more of randomized transmission periods and randomized transmission frequencies.

19. The communication system of claim 12, wherein each of the plurality of communication devices comprises a DFD enabled transceiver comprises instructions for:

receiving a primary signal from a receiver front end, an antenna, or a receiver input port;
receiving a reference signal from a transmitter;
processing the reference signal with an adaptive filter, wherein the adaptive filter uses the reference signal and primary signal as inputs for determining filter weights of the adaptive filter to provide an output; and
subtracting the output of the adaptive filter from the primary signal to generate a cancelled signal.

20. A method, comprising:

identifying available channels for communication using cognitive radio techniques;
listening to a frequency spectrum for an incoming beacon;
transmitting an outgoing beacon based on the identified available channels while listening to the frequency spectrum; and
cancelling interferences between the incoming beacon and the outgoing beacon using a division-free duplexing (DFD) technique.

21. The method of claim 19, wherein the cognitive radio techniques comprises one or more of monitoring spectral use, avoiding channels in use by primary devices, and using statistical analysis to predict available channels.

22. The method of claim 19, wherein the cognitive radio techniques comprises:

identifying an interference or a potential interference from a secondary device on a channel occupied by a primary device;
transmitting a silencer signal to the secondary device; and
ceasing a transmission from the secondary device on the occupied channel based on the silencer signal.

23. The method of claim 22, wherein the secondary device is a DFD enabled device.

* * * * *